(12) United States Patent
Payraudeau et al.

(10) Patent No.: US 6,632,365 B1
(45) Date of Patent: Oct. 14, 2003

(54) METHOD FOR TREATING AN EFFLUENT USING SIMULTANEOUS NITRIFICATION/DENITRIFICATION IN A BIOLOGICAL FILTER

(75) Inventors: Michele Payraudeau, Eaubonne (FR); Xavier Le Tallec, Canestan-Cestas (FR)

(73) Assignee: OTV SA (FR)

( * ) Notice: Subject to any disclaimer, the term of this patent is extended or adjusted under 35 U.S.C. 154(b) by 0 days.

(21) Appl. No.: 09/856,831

(22) PCT Filed: Dec. 23, 1999

(86) PCT No.: PCT/FR99/03280
§ 371 (c)(1),
(2), (4) Date: Jun. 22, 2001

(87) PCT Pub. No.: WO00/39034
PCT Pub. Date: Jul. 6, 2000

(30) Foreign Application Priority Data

Dec. 23, 1998 (FR) .............................................. 98 16508

(51) Int. Cl.⁷ .................................................. C02F 3/00
(52) U.S. Cl. ........................ 210/617; 210/622; 210/739; 210/150

(58) Field of Search ................................. 210/615, 616, 210/617, 618, 629, 739, 622, 800, 807, 746, 150

(56) References Cited

U.S. PATENT DOCUMENTS 5,518,620 A * 5/1996 Eguchi et al. ............... 210/150
6,395,522 B1 * 5/2002 DeFilippi et al. ........... 210/601

FOREIGN PATENT DOCUMENTS

| EP | 550 367 | 7/1993 |
| EP | 60 23390 | 2/1994 |
| EP | 683 139 | 11/1995 |
| FR | 2 547 574 | 12/1984 |
| GB | 2 099 807 | 12/1982 |
| WO | 98 32703 | 7/1998 |

* cited by examiner

Primary Examiner—Chester T. Barry
(74) Attorney, Agent, or Firm—Coats & Bennett, P.L.L.C.

(57) ABSTRACT

The invention concerns a method and installation for the treatment of excess sludge derived from biological wastewater treatment plants. The method is characterized in that it consists of associating at least one digestion step (4) and at least one wet oxidation step (2) of said sludge, said wet oxidation step being conducted at a temperature of between 50° C. and 180° C. and at a pressure of between 2 and 40 bar.

20 Claims, 3 Drawing Sheets

Figure 1:
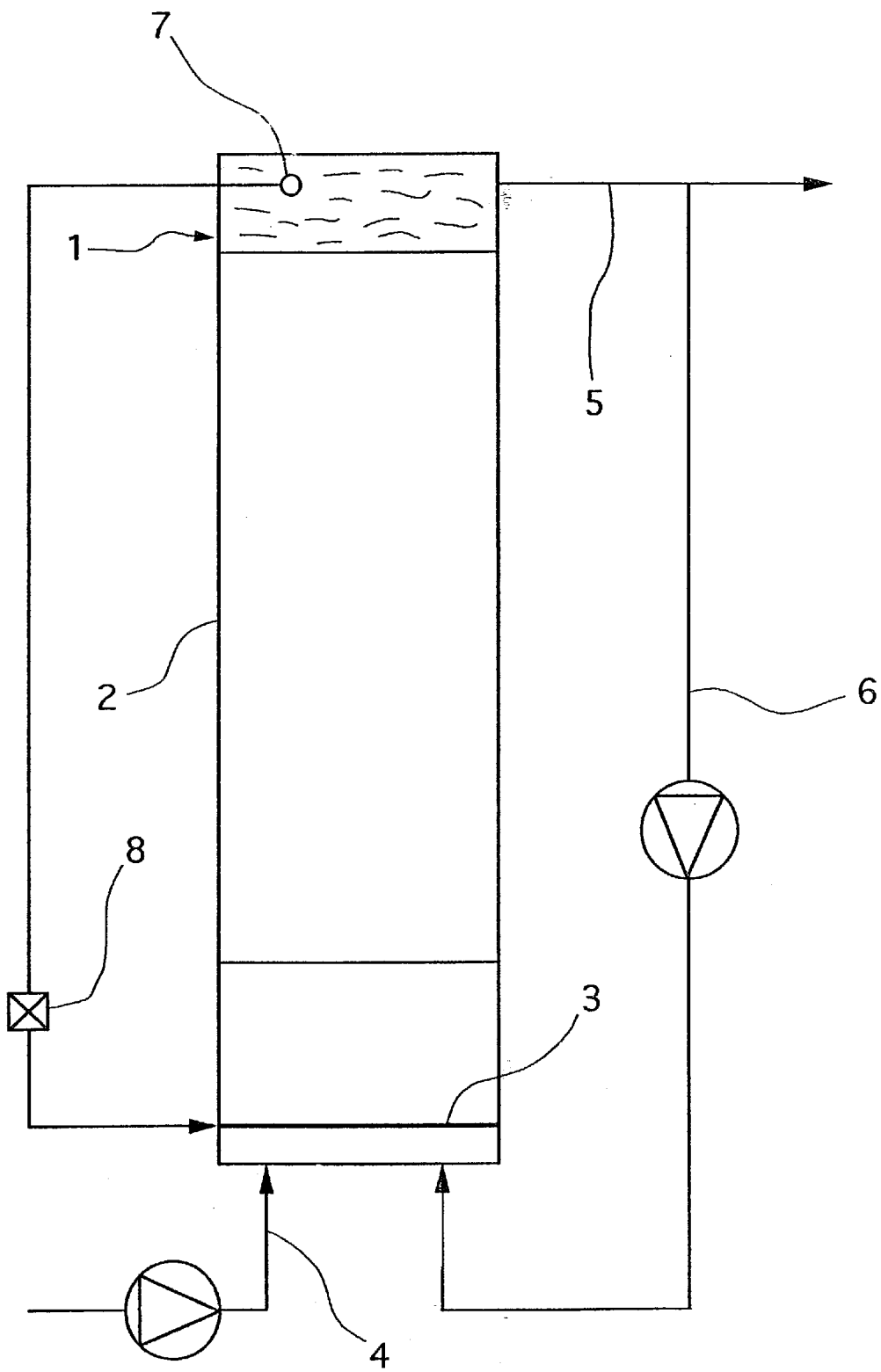

METHOD FOR TREATING AN EFFLUENT USING SIMULTANEOUS NITRIFICATION/ DENITRIFICATION IN A BIOLOGICAL FILTER

The invention concerns the area of the biological treatment of effluent for its purification such as, but not exclusively, urban or industrial wastewaters. More precisely, the invention concerns the treatment of sludge derived from the biological treatment of this effluent.

Such methods of biological treatment consist of contacting the effluent to be treated with a biomass which is able to degrade the pollution it contains. The application of such treatments leads to a gradual increase in the quantity of biomass and the need to evacuate excess biomass. This excess biomass is hereinafter called "excess sludge".

One of the major problems raised by the biological treatment of wastewater relates to the ever increasing quantities of this excess sludge.

Various technical solutions have been imagined to reduce these quantities.

Among these techniques, particular mention may be made of incineration, dewatering, wet oxidation (WO), chemical and biological treatment in order to obtain products that can be given reuse in agriculture, digestion that is to say chiefly methanisation (or anaerobic digestion) or even thermophilic aerobic stabilisation.

Methanisation and thermophilic aerobic digestion can reduce the volume of excess sludge by degrading part of the volatile matter (VM) it contains, up to approximately 50% of the initial volume of the sludge. In addition to the reduction of this volatile matter, these methods lead to the digesting and sanitization of the excess sludge.

It has already been suggested in the prior art to increase the efficacy of sludge digestion by causing it to undergo a preliminary treatment step.

As preliminary treatment it was proposed for example to submit the sludge to mechanical grinding upstream from an anaerobic digester, or even treatment by ultrasound.

With these preliminary treatments it is possible to reduce the residence time of the sludge in the digesters while maintaining a substantial reduction in the volume of volatile matter. However, such pre-treatments, at the most, only lead to removing 60% of the volatile matter contained in the sludge, hence the necessity to remove the residual excess sludge after digestion. Moreover, they require the use of relatively costly equipment.

Another solution, based on the action of ozone was also put forward. For example the process described in European patent application EP-A-0 645 347 suggests applying the action of ozone to the mixed liquor recirculated in the biological basin in order to reduce the production of excess sludge. The main disadvantage of this technique arises from the difficulties inherent in the use of ozone which is a highly oxidizing reagent, and the cost of its use.

The main purpose of the present invention is to put forward a method for treating excess sludge derived from the biological treatment of effluent, with which it is possible to fully eliminate the production of excess sludge.

This objective is achieved through the invention which concerns a method for treating excess sludge derived from at least one facility for the biological treatment of effluent leading to the production of excess sludge, characterized in that it consists of associating at least one digestion step and at least one wet oxidation step of said sludge, said wet oxidation step being conducted at a temperature lying between 50° C. and 180° C. and at a pressure of between 2 and 40 bar.

It was found, in unexpected manner, that said treatment of excess sludge by wet oxidation under the above-mentioned conditions of temperature and pressure, combined with the biological digestion thereof, made it possible to considerably reduce the volume of residual sludge and could even, when applicable, lead to its total elimination. This result amounts to a considerable advantage compared with the prior art.

It will be noted that in this description by the term "digestion" is meant any method known to persons skilled in the art for degrading sludge with a biomass. This term includes in particular:

anaerobic digestion, also called methanisation, which degrades the organic molecules of the sludge into $CO_2$, $CH_4$ and $NH_3$; anaerobic digestion may be mesophilic, that is to say conducted at a temperature ranging from 30° C. to 37° C., or thermophilic, that is to say conducted at a higher temperature;

thermophilic aerobic stabilisation conducted at a temperature of between 45° C. and 70° C., preferably between 50° C. and 65° C., which consists of biological oxidation made by the injection of air into a stirred tank.

It will also be observed that the conditions of temperature and pressure recommended by the present invention for the wet oxidation step are distinctly less harsh that the usual conditions for WO for which the temperatures used are generally between 180° and 300° C. with pressures ranging up to 120 bar. With the conditions of the invention, it is possible to inactivate the biomass so that it can be partly oxidized and solubilized, but in unexpected manner without causing the formation of insoluble mineral residues (oxides, carbonates, sulfates, etc.. ) which could not be removed during the digestion step and which would hinder the conducting of this step and therefore limit the possibilities of reducing the quantity of sludge to be evacuated.

According to one preferred variant of the invention, the method consists of subjecting said sludge to digestion, wet oxidizing the digested sludge, and recirculating said oxidized sludge towards said digestion step. A quantity of biomass in equal or higher quantity to the excess sludge from a conventional biological waste treatment process could be recirculated in said oxidation unit.

According to another variant, the method of the invention may also consist of wet oxidizing the excess sludge and then causing it to undergo digestion.

Also, according to another variant, the method comprises an additional step to thicken the sludge conducted before or after said wet oxidation step.

The wet oxidation step recommended above may be applied for a treatment time that varies in particular in relation to the effluent to be treated. However, according to one preferred variant, this step is preferably conducted for a time period of between 10 mn and 180 mn.

In order to further reinforce the efficacy of this step, it may also be preferable to provide for prior pH adjustment of the sludge derived from the biological treatment facility, to a value varying between 2 and 11 as required.

For the same purpose of increasing the efficacy of the wet oxidation step under the present invention, this step may advantageously be conducted using an oxidant/chemical oxygen demand (COD) ratio of the excess non-treated sludge that lies between approximately 0.2 and 1.5.

The oxidizing agent used during the wet oxidation step may be air, oxygen, oxygen-enriched air, hydrogen peroxide either alone or in combination with one of the three previously cited compounds.

According to one variant of the method, a catalyst may advantageously be used for the wet oxidation step to increase the efficacy of COD reduction, COD solubilisation and the reduction of suspended solids (SS) in the sludge to be treated. This catalyst may be homogeneous or heterogeneous.

Preferably, this catalyst is a metal chosen from the group made up of manganese, iron, cobalt, nickel, copper, zinc and the mixtures and compounds of one or more of the latter. In best preferred manner, this homogeneous catalyst is a soluble compound of copper and/or zinc.

According to one advantageous variant of the method, ammonia-containing nitrogen may be removed during the oxidizing treatment of the sludge in catalytic manner by using a heterogeneous catalyst in the oxidation unit positioned above the interface measurement means 7 to measure the concentration of dissolved oxygen in the effluent and means 8 to adjust the operation of the aerating means 3 in relation to the results of the measurements made by said measurement means 7.

A facility according to the prior art, only differing from the one shown in FIG. 1 in the position of the aeration ramp positioned inside the filtering bed (such as to form within the latter an upper aerobic zone and a lower anoxic zone) and in the absence of measurement means and adjustment means, was used as a reference.

The height of the filtering material in the filtering beds of both facilities was 2.75 m.

The filtering rate was fixed at 3.0 m/h and the rate of recirculation at 100% the feed flow rate.

The same water was treated in both facilities.

Table 1 shows the results obtained with the method of the invention over one day's operation (daily average) and when using the conventional method.

|  | mean N—NH4 clarified water (mg/l) | mean N—NH4 treated water (mg/l) | mean N—NO3 treated water (mg/l) | Air velocity Nm³/h/m² | % yield on N—NH4 + N—NO3 |
|---|---|---|---|---|---|
| N-DN Conventional filter | 68 | 9.0 | 21.3 | 10.1 | 54% |
| N-DN simultaneous (invention) | 63 | 1.7 | 21.4 | 5.3 | 65% |

Figure 2:
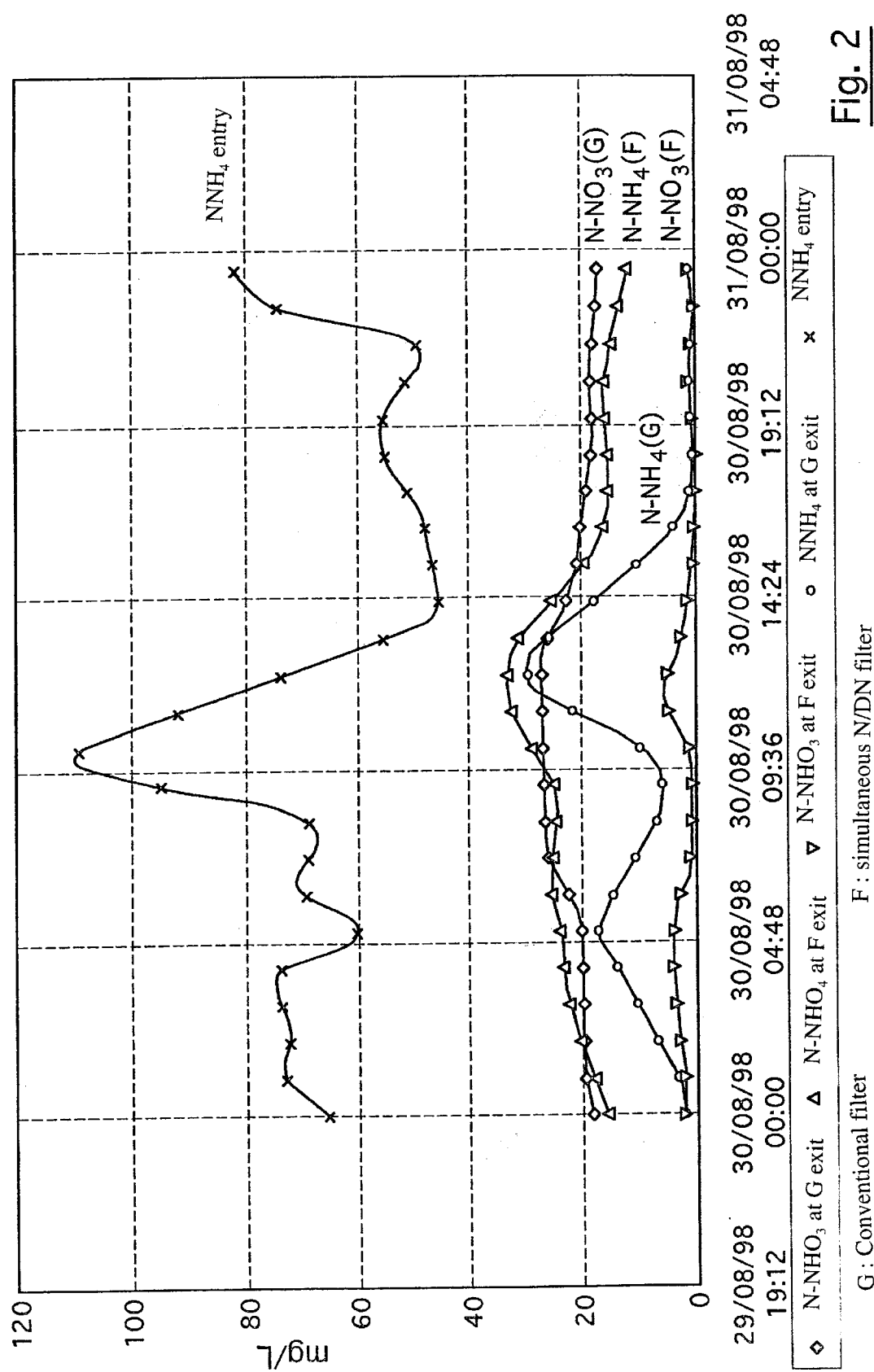

This table only gives average values, the values obtained over 24 hours corresponding to these averages being given in FIG. 2.

The curves shown in this FIG. 2 clearly demonstrate that the effluent treated using the method of the invention has a lower content of ammonia-containing nitrogen than the effluent treated with the conventional method.

Figure 3:
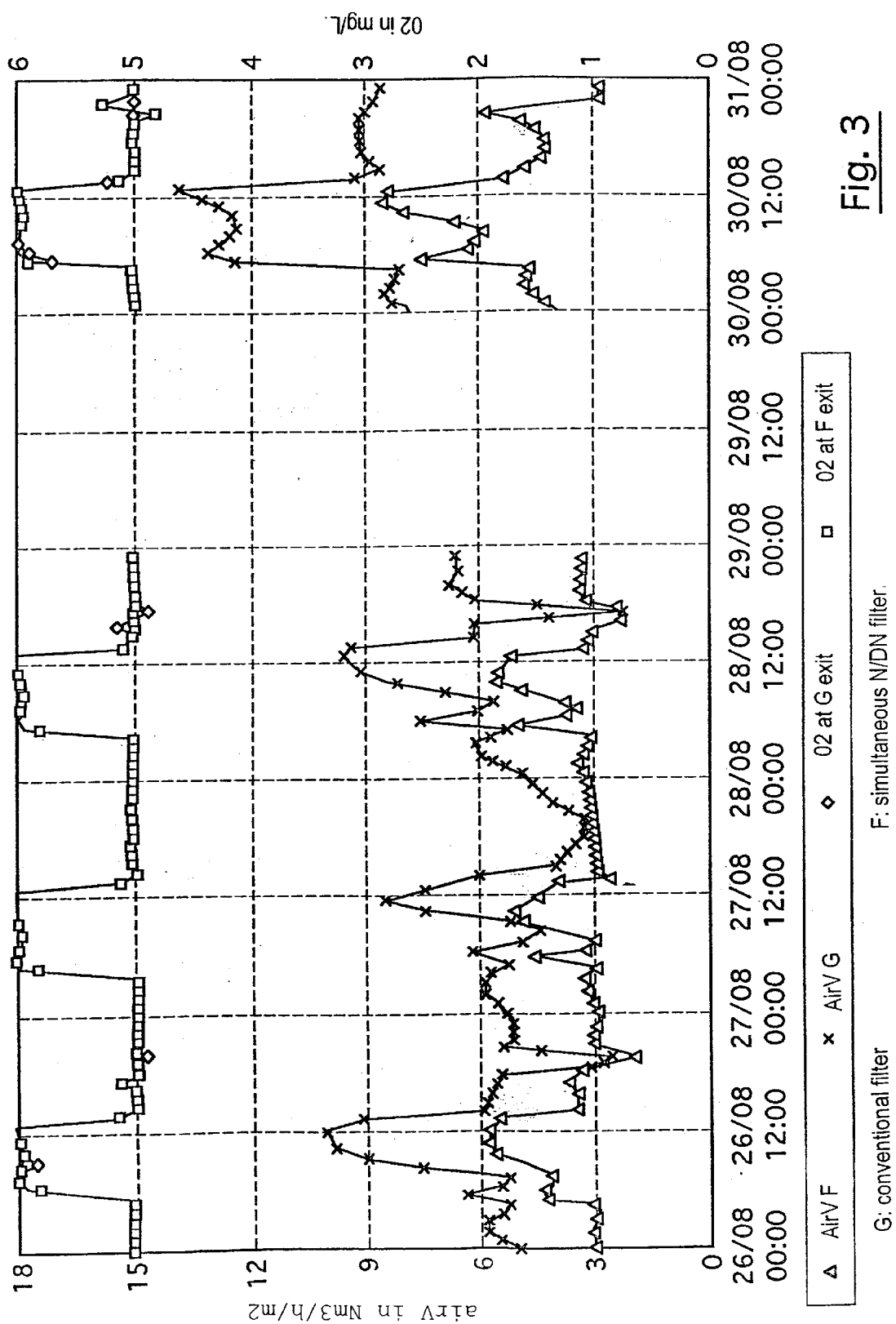

FIG. 3, which compares the air velocities used in the filter according to the method of the invention and the filter of the conventional method, proves the advantage of the method of the invention which indicates a better oxygen transfer coefficient and therefore less air consumption.

To conclude, compared with the nitrogen removal methods with one or two fixed culture reactors, the method of the invention offers the following advantages:

no need to install an intermediate ramp within the material to delimit two separate zones inside one same reactor, namely an aerated zone and a non-aerated zone;
  no need to use two separate reactors, one aerated for nitrification and the other operating under anoxia for denitrification;
  reduced costs at operating level, even possible economic savings in respect of its size;
  energy saving at operating level since improved aeration yield can be obtained owing to the fact that the injected air crosses through a greater height of material at an injection flow rate that is lower than those recommended by conventional methods which use one or two reactors;
  the treated water is of improved quality.

The facilities for implementing said method may moreover be monitored using a simple system.

Finally, it will be noted that with said method it is possible to rehabilitate an existing installation at minimum cost.

The embodiment of the invention described is not intended to reduce the scope of the invention.

What is claimed is:

1. A method of simultaneously performing nitrification and denitrification of a wastewater effluent, comprising:
  a. directing the wastewater through a biological filter with cultures fixed to at least one bed of granular material;
  b. continuously aerating and supplying oxygen to substantially the entirety of said bed of granular material;
  c. measuring at least one parameter representing the oxygen consumption of said fixed cultures;
  d. adjusting the supply of oxygen to the bed of granular material in relation to the results of measuring said parameter and of a set-value thereof; and
  e. wherein the wastewater passing through the biological filter and the granular material is simultaneously nitrified and denitrified.

2. The method of claim 1 wherein said set value of said parameter is determined in relationship to the nitrogen content of said effluent or by a level of pollution measured at the outlet of said biological filter.

3. The method of claim 1 wherein the method produces a treated effluent and wherein the method further comprises recirculating at least a part of the treated effluent through the biological filter.

4. The method of claim 3 comprising recycling the treated effluent at a recycled rate of between 75% and 400%.

5. The method of claim 1 wherein the biological filter is vertically oriented and wherein the effluent is vertically directed through the biological filter.

6. The method of claim 2 wherein the effluent is directed into a lower portion of the biological filter and caused to move upwardly through the biological filter.

7. The method of claim 1 wherein said parameter is selected from the group consisting of: the concentration of dissolved oxygen, the redox potential, the ammonium concentration, the nitrate concentration, and the NADH concentration of the treated effluent.

8. The method of claim 1 wherein measuring said parameter is conducted on the treated effluent leaving said biological filter.

9. The method of claim 1 wherein measuring said parameter is conducted on the effluent being transmitted through said biological filter.

10. The method of claim 1 wherein measuring said parameter comprises measuring the concentration of dissolved oxygen in the treated effluent.

11. The method of claim 10 including adjusting the oxygen supplied to the granular material so as to maintain the concentration of oxygen of the treated effluent at a value of between 3 and 8 mg/l.

12. The method of claim 11 including adjusting the oxygen supplied to the granular material so as to maintain the concentration of dissolved oxygen of the treated effluent at a value of between 4 and 7 mg/l.

13. The method of claim 1 including adding to said effluent at least one source of carbon.

14. The method of claim 1 including subjecting the treated effluent leaving the biological filter to additional denitrification.

15. An installation for carrying out the method of claim 1 including at least one biological filter including granular material, and adjustable oxygen supply means for adjustably supplying oxygen to the biological filter.

16. The installation of claim 15 further including means for measuring at least one parameter representing the oxygen consumption of fixed cultures on the granular material and wherein the oxygen supply means is adjustable in response to the measurement of the oxygen consumption of said fixed cultures such that the oxygen being supplied to the biological filter can be increased or decreased.

17. The installation of claim 15 wherein the biological filter is an ascending type and comprises a fluidized bed of granular material and a recirculation line that permits treated effluent to be recirculated through the biological filter.

18. The installation of claim 16 wherein said measurement means includes at least one dissolved oxygen concentration sensor positioned above a bed of granular material forming a part of the biological filter.

19. The installation of claim 18 wherein the dissolved oxygen concentration sensor is positioned approximately 5 cm to 40 cm above the granular material.

20. The installation of claim 15 comprising at least one separating unit to separate the treated effluent from the granular material.

* * * * *